United States Patent
Webb

(10) Patent No.: US 6,301,384 B1
(45) Date of Patent: Oct. 9, 2001

(54) LOW PASS BLURRING IMAGE FILTER FOR FILTERING ONLY GREEN

(75) Inventor: Robert I. Webb, Lebanon, NJ (US)

(73) Assignee: NuWave Technologies, Inc., Fairfield, NJ (US)

( * ) Notice: Subject to any disclaimer, the term of this patent is extended or adjusted under 35 U.S.C. 154(b) by 0 days.

(21) Appl. No.: 09/382,866

(22) Filed: Aug. 25, 1999

(51) Int. Cl.[7] ....................................................... G06K 9/00
(52) U.S. Cl. ............................................. 382/167; 382/264
(58) Field of Search ................................. 382/162, 163, 382/166, 167, 264, 274; 358/518, 520, 519, 530, 515; 348/234–239, 259, 260, 242, 265, 342, 650, 651, 663, 666, 683, 712, 713; 345/150–155, 600–605

(56) References Cited

U.S. PATENT DOCUMENTS

| | | |
|---|---|---|
| 4,663,661 * | 5/1987 | Weldy et al. ......................... 348/242 |
| 4,689,666 | 8/1987 | Hatanaka . |
| 4,962,419 | 10/1990 | Hibbard et al. . |
| 5,557,339 | 9/1996 | Dadourian . |
| 5,667,474 | 9/1997 | Nishimura . |
| 5,715,015 | 2/1998 | Lee . |

* cited by examiner

Primary Examiner—Timothy M. Johnson
(74) Attorney, Agent, or Firm—Steven J. Adamson

(57) ABSTRACT

An apparatus and method for efficiently filtering or otherwise processing digital color image data. The invention may be implemented in hardware, firmware or software. In one embodiment, the green color signal is filtered while the blue and red color signal are not filtered. This results in less filtering circuitry and processing time, while retaining the sharpness of the unfiltered signals. Since the human eye is more sensitive to the color green, filtering this color produces the greatest amount of noise reduction per color. Alternative color and filtering arrangements are also disclosed as is file conversion logic.

23 Claims, 2 Drawing Sheets

LOW PASS BLURRING IMAGE FILTER FOR FILTERING ONLY GREEN

FIELD OF THE INVENTION

The present invention relates to digital color image signal processing. The present invention is applicable to still-frame pictures and motion pictures.

BACKGROUND OF THE INVENTION

The advent of the Internet and improvements in computer technology have lead to more frequent transmission of color image data via computer networks and to the display of color images on computers or like devices. It is expected that the use of computers for displaying color image data and the need to enhance image quality will continue to increase, particularly as computers and like devices are used to display motion pictures.

Various filter and image data processing circuits/logic have been developed to support advances in digital color image data processing. These circuits/logic include color, contrast, brightness and related circuits/logic.

Color image data is typically generated by subjecting raw image data to a compression algorithm. The compressed data can be more rapidly transmitted and/or more efficiently stored than non-compressed data. The compressed data is decompressed and interpolated for display.

During compression (and due to other causes), defects may be introduced into color image data. These defects often take the form of holes or graininess in a displayed image. Decompression and interpolation algorithms may also contribute to these defects.

In an effort to reduce image defects and to generally improve image quality, color filter circuits/logic have been developed. In a parallel filtering arrangement, separate filters operate on each of the three primary color signals. This results in rapid processing, but necessitates a large amount of processing circuitry. In a serial filtering arrangement, each color signal is fed serially through the same filter circuitry. While serial arrangements decrease the requisite amount of circuitry by approximately two-thirds compared to parallel arrangements, serial arrangements increase processing time approximately three-fold.

In addition to noise and defect reduction, filters also reduce the clarity or sharpness of an image. Thus, by filtering each of the color signals, a cumulative reduction in image clarity is produced.

SUMMARY OF THE INVENTION

Accordingly, it is an object of the present invention to provide filtering of color image data in a manner that requires less circuitry and/or processing time.

It is another object of the present invention to achieve this filtering in a manner that causes less image clarity reduction.

It is another object of the present invention to provide filtering of less than all of the primary colors of a color image data signal.

It is also an object of the present invention to provide filtering of the color or colors to which the human eye is most sensitive.

These and related objects of the present invention are achieved by use of an improved color image data processing apparatus and method as described herein.

In one embodiment, the present invention includes logic and/or a method for color image data processing in which the green color signal is filtered while the blue and red color signals are not filtered. The human eye is most sensitive to the color green. As a result, filtering this color produces the largest amount of recognizable noise reduction (or otherwise stated image quality enhancement) per primary color signal. By filtering only one of the primary colors (or less than all), the amount of processing circuitry and/or the amount of processing time is significantly reduced.

Furthermore, by not filtering the blue and red components (or by not filtering at least one of these components), the sharpness contained in the unfiltered component is contributed to the final image signal. Thus, a reduced noise, sharper contrast signal from minimal circuitry and processing is achieved.

It should be recognized that other primary color schemes (e.g. CMYK or YUV, etc.) may be utilized, without departing from the present invention's teaching of filtering less than all of the primary color signal components, and preferably (but not necessarily) filtering the color or colors to which the human eye is most sensitive. It should also be recognized that while filtering one of the color signals is preferred, filtering more than one, but less than all is also within the present invention.

The attainment of the foregoing and related advantages and features of the invention should be more readily apparent to those skilled in the art, after review of the following more detailed description of the invention taken together with the drawings.

DETAILED DESCRIPTION

The present invention includes the digital processing of color image data. Color image data may be processed in hardware, firmware and software. In a preferred embodiment, the present invention is implemented in software that is executed on a processor, such as the CPU or other processor of a computer. It should be recognized that aspects of the present invention may be implemented in firmware or hardware given the teachings herein, and these implementations are within the scope of the present invention. The term logic as used herein is intended to represent software, firmware or hardware implementations/embodiments.

In the discussion that follows, red (R), green (G) and blue (B) are discussed as the primary colors. It should be recognized that other color schemes (e.g., CMYK and YUV, and complementary color schemes, etc.) could be utilized without departing from the present invention.

Figure 1:
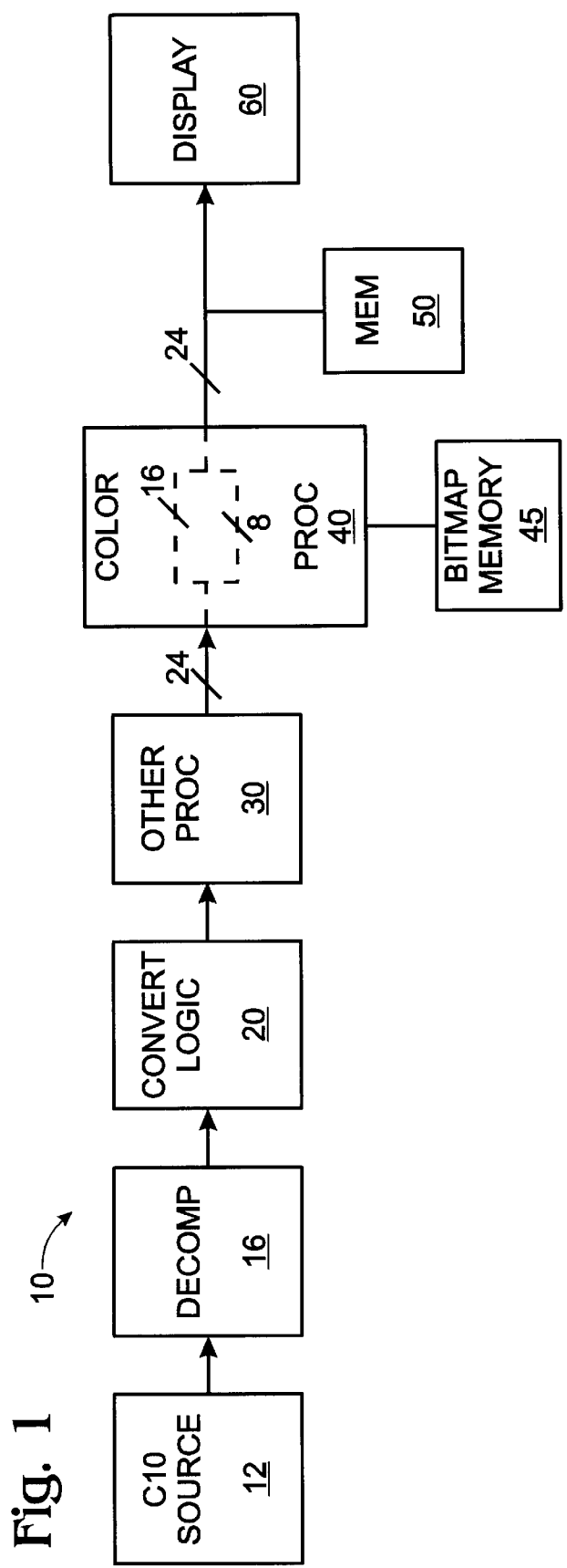
FIG. 1 is a block diagram of color image data (CID) processing logic 10 in accordance with the present invention.

Referring to FIG. 1, a block diagram of color image data (CID) processing logic 10 in accordance with the present invention is shown. Block 12 represents a source of CID which may be a digital camera, a scanner, an Internet transmission, an image file in memory, etc. As alluded to above, CID is typically stored and/or transmitted in a compressed manner, though it is conceivable that CID may be provided in a non-compressed manner, for example, streamed directly out of a digital camera.

Block 16 represents decompression and interpolation logic. Suitable decompression and interpolation logic is known in the art.

Block 20 represents conversion logic (hereinafter referred to as "conversion logic 20"). Conversion logic converts the input CID to a common format. Examples of possible input formats include JPG, AVI, etc. A preferred common format is standard device independent bitmap (DIB) format. This format provides a one byte (8 bits) value for each of three primary colors, e.g., RGB (alpha data bits may also be provided as is known though they are not discussed here). Accordingly, the output of conversion logic 20 is preferably a 24 bit signal that includes an 8 bit pixel value for each primary color.

It should be recognized that conversion logic 20 is preferably capable of converting other color signal arrangements, e.g., CMYK, etc., into an RGB arrangement. It should also be recognized that decompression and interpolation logic 16 may be integrated into conversion logic 20 such that compressed data is converted to DIB as it is decompressed.

Block 30 receives the formatted CID (FCID) output from converter logic 20 and is representative of other processing logic. This may include logic that calculates an average pixel value and if that average is below a certain threshold increases the value of all pixels by a certain offset. This provides automatic contrast adjustment. Other processing may include brightness and black level adjustment, etc. Logic for performing these and related functions is known in the art.

The FCID is output from block 30 to color processing logic 40. Color processing logic 40 preferably performs filtering on the green color signal (or on less than all of the primary color signals as described in more detail below). The filtered green color signal is preferably stored with the other color signals in bit map memory (processor RAM) 45. The filtered green color signal (or other color signal) and the unfiltered red and blue (or other color signals) are then output from color processing logic 40 for storage at memory 50 and/or for display via a display mechanism 60. Display mechanism 60 may be any suitable display mechanism including, but not limited to, a monitor, a printer, a projection system, an overhead, etc.

As mentioned in the Summary above, the human eye is more sensitive to the color green than to the colors blue and red. Thus, by filtering the color green, the greatest amount of noise reduction per color signal is achieved. Furthermore, by filtering only one (or less than all of the primary colors), processing time and/or processing circuitry is significantly reduced. In addition, by not filtering the red and blue color signals, the sharpness contained in these signals is passed through to the final image.

Figure 2:
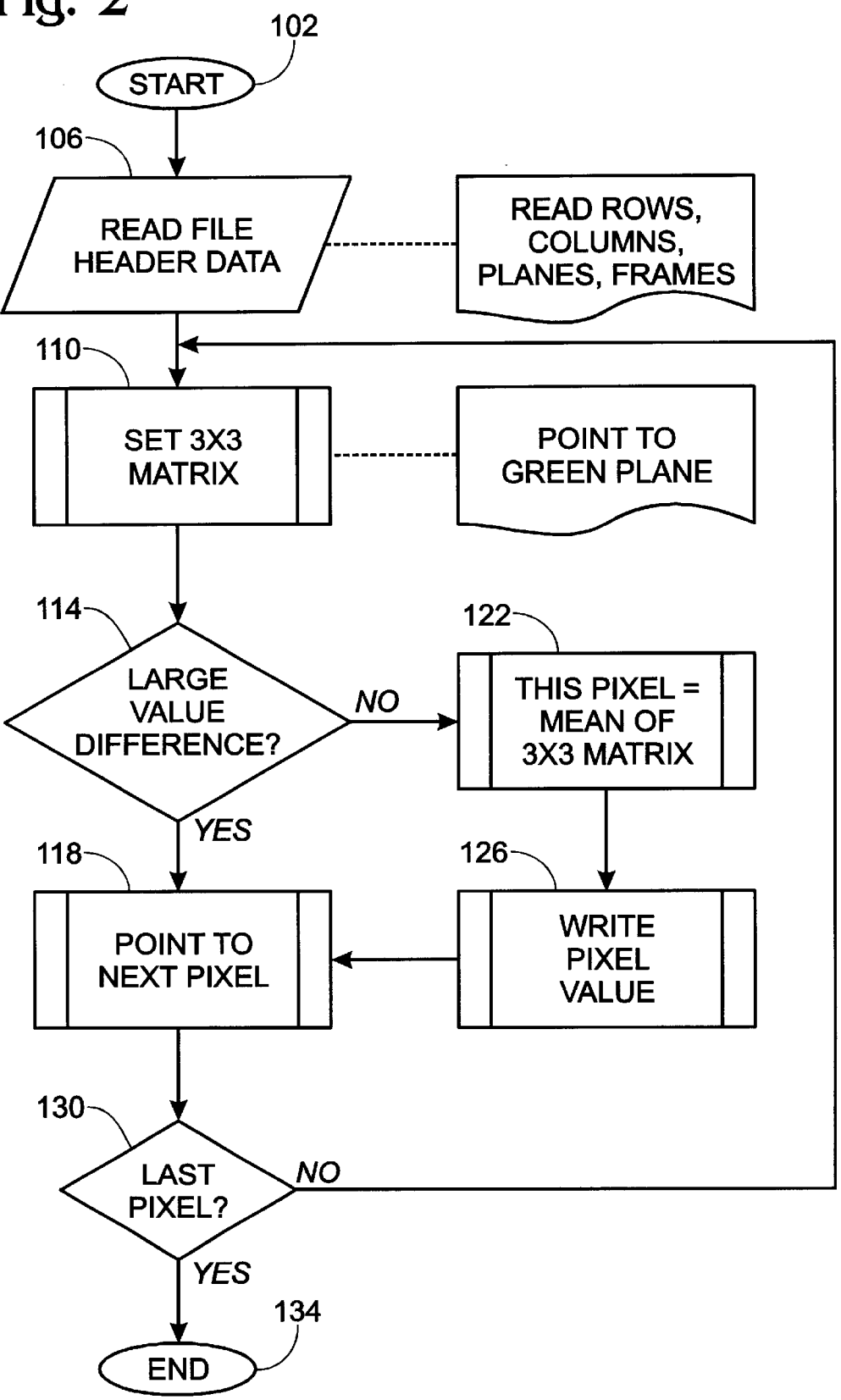
FIG. 2 is a diagram of color signal filtering in accordance with the present invention.

Referring to FIG. 2, a diagram of color signal filtering in accordance with the present invention is shown. Oval 102 denotes the start of processing. In step 106, a file (a frame of FCID) is read in by the color processing logic 40 (FIG. 1). The header is examined to determine file size and type and to extract other known header information. Bit-mapped pixel data contains row, column and plane designations (e.g., pointers) as is known in the art. These are appropriately analyzed.

In step 110, a filter matrix that points to an appropriate pixel (the "target" pixel) is established (or updated). A three by three matrix is preferably established, although other matrix sizes may be utilized. Initially the matrix is set to point at the first green pixel and its surrounding pixels. Bitmap pointers are preset for pointing to this target pixel and the surrounding pixels to hence form the matrix.

In step 114, the value of the target pixel is preferably compared to the mean of the target pixel and surrounding pixels. If the difference between the target pixel and the calculated mean is large (indicating an abrupt color change, i.e., an edge of a different item in the image), then no filtering is performed and the process flow continues to step 118, where the next target pixel (e.g., green) is pointed to. If the difference between the target pixel and the calculated mean is not large, then in step 122, the value of the target pixel is changed to equal the mean value. This new pixel value is then stored to bitmap memory 45 (step 126).

In step 130, a designation is made as to whether the last pixel in the current frame has been processed. If no, processing returns to step 110 where the next target pixel is pointed to. If yes, processing of the color green for the current frame is complete (oval 134). For a motion picture, the next frame is then loaded at step 106 and processing proceeds from step 110.

The filtering process described with reference to FIG. 2 may be described as a blur or low pass filter. More specifically, the filtering process may be referred to as a "smart blur" because it blurs or filters some pixels (those that have a value that is not significantly different from the mean) and does not blur other pixels (those that are significantly different). A large difference indicates an edge and sharpness may be lost by blurring edges. The amount of selective blurring or filtering (or whether to exclude pixels at all) may be selected by the programmer that is implementing the filter program. Comparison based on average, minimum, maximum or other programming may also be utilized.

While blur filtering is discussed above, it should be recognized that other types of filtering or processing may be achieved without departing from the present invention's teaching of processing less than all of the color signals and processing the color signal(s) to which the human eye is most sensitive.

It should further be recognized that since the human eye is more sensitive to the color blue than the color red, filtering blue and/or green and not filtering the color red reduces processing time and circuitry and achieves significant noise reduction, while preserving the sharpness in the red color signal.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A digital color image data (CID) improving apparatus, comprising:

an input that is configured to receive and propagate, in series or parallel, at least three separate and distinct color signals, each color signal being comprised of digital color image data for only one color and the color of each of said three color signals being different;

filter logic coupled to said input that filters the color signal of the color to which the human eye is most sensitive and does not filter one of the other color signals;

said filter logic being further configured to receive the digital color image data of the color signal to be filtered in a stream of color image data values, and functioning to compare a received color image data value to a value derived from neighboring data values of the same color and to adjust the magnitude of the received color image data value if predefined criteria are met; and an output coupled to said filter logic that outputs the filtered color signal along with the unfiltered color signal.

2. The apparatus of claim 1, wherein said filter logic functions at least in part to create said neighbor derived value from color image data values that are located above, below and to the left and right sides of the received data value.

3. The apparatus of claim 1, wherein said filter logic functions such that when the difference between the received data value and the neighbor derived value is above a given threshold, the received value is not adjusted, and such that when the difference is below that given threshold, the received data value is adjusted; said threshold thus serving as one of said predefined criteria.

4. The apparatus of claim 1, wherein said filtered color signal is representative of the color green.

5. The apparatus of claim 1, wherein said color signals include red, green and blue color signals and the green color signal is filtered and the red and blue color signals are not filtered.

6. The apparatus of claim 1, wherein said color signals are received at said input in a color image data file, and said apparatus further comprises conversion logic coupled between said input and said filter logic that investigates the file format type of an input digital color image data file and, if necessary, converts the format of that file into a common format.

7. The apparatus of claim 6, wherein said common format is device independent bitmap (DIB) format, said DIB format containing said plurality of color signals.

8. The apparatus of claim 1, wherein said filter logic filters more than one and less than all of said color signals.

9. A color image data (CID) improving apparatus, comprising:

an input that receives digital CID that is comprised of red, green and blue color signals, and each of said color signals is separate and distinct and representative of only one color;

color filter logic coupled to said input that filters said green color signal by comparing each of a plurality of green image data values to a value derived from neighboring green image data values and adjusting, if appropriate, the magnitude of each of said plurality of green color data values based on the corresponding neighbor derived value, and wherein said color filter logic does not filter said red and blue color signals; and an output coupled to said filter logic that outputs said filtered green color signal along with said unfiltered red and blue color signals.

10. The apparatus of claim 9, wherein said filter logic functions at least in part to create said neighbor derived value from green image data values that are located above, below and to the left and right sides of the subject green data value.

11. The apparatus of claim 9, wherein said filter logic functions such that when the difference between the subject green data value and the neighbor derived green data value is above a given threshold, the subject green data value is not adjusted.

12. The apparatus of claim 9, further comprising conversion logic coupled between said input and said filter logic that converts an input CID file into a format that includes the red, green and blue color signals.

13. The apparatus of claim 12, wherein said common format is device independent bitmap (DIB) format.

14. A method of improving digital color image data (CID), comprising the steps of:

receiving digital CID that is comprised of a plurality of separate and distinct color signals, each color signal being representative of only one color and the color of each color signal being different;

filtering the one of said color signals that has a color to which the human eye is most sensitive and not filtering one of said color signals of another color, said filtering step including comparing a received color image data value from said color signal to be filtered with a value derived from neighboring data values and adjusting the magnitude of the received color image data value if predefined criteria are met; and outputting the filtered color signal along with the unfiltered color signal.

15. The method of claim 14, wherein said filtering step includes the step of creating said neighbor derived value from color image data values that are located above, below and to the left and right sides of the received data value, said predefined criteria including the magnitude of the difference between the received data value and the corresponding neighbor derived value being below a given threshold.

16. The method of claim 14, wherein said filtering step includes the step of not adjusting the received value when the difference between the received data value and the neighbor derived value is above a given threshold.

17. The method of claim 14, wherein said filtering step includes the step of filtering a color signal that is representative of the color green.

18. The method of claim 14, further including the step of checking the file format type of received digital CID and, if appropriate, based on file type, converting the received CID into a common format before filtering.

19. The apparatus of claim 1, further comprising decompression logic upstream of said filter logic that decompresses the digital color image data of each of said color signals.

20. The apparatus of claim 9, further comprising decompression logic upstream of said filter logic that decompresses the digital color image data of each of said color signals.

21. The method of claim 14, further comprising the step of decompressing the digital color image data of each of said color signals.

22. A method of downloading machine executable code for improving the quality of digital image data, comprising the steps of:

providing a server computer;

downloading from said computer to an at least temporarily connected electronic device machine executable code that when executed performs the steps of:

receiving digital CID that is comprised of a plurality of separate and distinct color signals, each color signal being representative of only one color;

filtering the one of said color signals that has a color to which the human eye is most sensitive and not filtering one of said color signals of another color;

said filtering step including the steps of:

receiving the color signal to be filtered as a stream of color image data values;

comparing a received color image data value from said color signal with a value derived from neighboring data values; and adjusting the magnitude of the received color image data value depending on the difference between the received data value and the neighbor derived data value; and outputting the filtered color signal along with the unfiltered color signal.

23. A medium that stores machine executable code for improving the quality of digital color image data, comprising:

a substrate that is capable of storing machine executable code; and machine executable code stored in said substrate that performs the functions of:

receiving digital CID that is comprised of a plurality of separate and distinct color signals, each color signal being representative of only one color;

filtering the one of said color signals that has a color to which the human eye is most sensitive and not filtering one of said color signals of another color;

said filtering step including the steps of:

receiving the color signal to be filtered as a stream of color image data values;

comparing a received color image data value from said color signal with a value derived from neighboring data values; and adjusting the magnitude of the received color image data value depending on the difference between the received data value and the neighbor derived data value; and outputting the filtered color signal along with the unfiltered color signal.

* * * * *

UNITED STATES PATENT AND TRADEMARK OFFICE
CERTIFICATE OF CORRECTION

PATENT NO.    : 6,301,384 B1
DATED         : October 9, 2001
INVENTOR(S)   : Robert I. Webb It is certified that error appears in the above-identified patent and that said Letters Patent is hereby corrected as shown below:

<u>Title page,</u>
Item [54], "LOW PASS BLURRING IMAGE FILTER FOR FILTERING GREEN ONLY" should read -- SELECTIVE BLURRING IMAGE FILTER FOR FILTERING COLOR TO WHICH HUMANS HAVE HIGH SENSITIVITY --.

Signed and Sealed this

Thirteenth Day of August, 2002

*Attest:*

JAMES E. ROGAN
*Attesting Officer*            *Director of the United States Patent and Trademark Office*